(12) United States Patent
Shadwell, Jr.

(10) Patent No.: US 8,042,741 B2
(45) Date of Patent: Oct. 25, 2011

(54) SYNTHETIC BARCODE SYSTEM AND METHOD

(75) Inventor: Percy F. Shadwell, Jr., Jacksonville, FL (US)

(73) Assignee: Randy D. McGill, St. Augustine, FL (US)

( * ) Notice: Subject to any disclaimer, the term of this patent is extended or adjusted under 35 U.S.C. 154(b) by 889 days.

(21) Appl. No.: 12/034,448

(22) Filed: Feb. 20, 2008

(65) Prior Publication Data

US 2008/0149721 A1    Jun. 26, 2008

Related U.S. Application Data

(63) Continuation-in-part of application No. 11/160,514, filed on Jun. 27, 2005, now Pat. No. 7,380,725.

(51) Int. Cl.
*G06K 19/06* (2006.01)

(52) U.S. Cl. ... 235/491; 235/454; 235/457; 235/462.01; 235/462.08; 235/462.09; 235/494

(58) Field of Classification Search ............... 235/454, 235/455, 462.01, 462.06, 462.11, 462.14, 235/462.24, 462.41, 462.42, 462.45, 472.01–472.03, 235/457, 462.08, 462.09, 491, 494
See application file for complete search history.

(56) References Cited

U.S. PATENT DOCUMENTS

| | | | | |
|---|---|---|---|---|
| 5,532,467 | A * | 7/1996 | Roustaei | 235/462.42 |
| 6,182,898 | B1 * | 2/2001 | Schmidt et al. | 235/462.45 |
| 7,322,526 | B1 * | 1/2008 | Koenck | 235/462.45 |
| 2001/0045465 | A1 * | 11/2001 | Schmidt et al. | 235/462.45 |

* cited by examiner

*Primary Examiner* — Thien M. Le
*Assistant Examiner* — Tuyen K Vo
(74) *Attorney, Agent, or Firm* — Mark Young, PA

(57) ABSTRACT

A synthetic barcode module detects the presence of a barcode reader and emits light pulses that emulate light reflected from a scanned barcode. Decoded output from a conventional barcode optical scanner that receives the light pulses will be the same as the decoded output generated by scanning the emulated barcode. One or more light pipes may be utilized to facilitate receipt and transmission of an incident scanning beam to an optical sensor/emitter. A sensor/emitter, which may be an LED, may sense input light and emit light pulses to emulate a scanned barcode. A microcontroller governs sensing and emitting. The module may be programmable to emulate various barcodes.

9 Claims, 5 Drawing Sheets

SYNTHETIC BARCODE SYSTEM AND METHOD

RELATED APPLICATION

This application is a continuation in part and claims the benefit of priority of pending U.S. Nonprovisional application Ser. No. 11/160,514, filed Jun. 27, 2005, the entire contents of which are incorporated herein by this reference and made a part hereof.

FIELD OF THE INVENTION

This invention generally relates to barcodes, and more particularly, to a system and method for detecting the presence of a laser barcode scanner using a sensor and then emitting light pulses that emulate light reflected from a determined barcode.

BACKGROUND

Barcodes are ubiquitous machine-readable representations of information. As is well known, barcodes usually comprise dark images printed on a light background to create high and low reflectance, which may be converted to digital data by a compatible scanner. Linear barcodes store data in the widths of and spacings between parallel lines.

Barcodes are read by optical scanners called barcode readers. Typically, a barcode reader includes a light source, a beam moving device such as a rotating mirror to cause the light beam to repeatedly sweep along a linear path, and an optical sensor that translates optical impulses into electrical ones. Additionally, most barcode readers include decoder circuitry configured to analyze the barcode's image data provided by the photo detector and sending the barcode's content to the scanner's output port.

One example of a type of reader is a pen or wand reader, which includes a light source and a photodiode that are placed next to each other in the tip of a pen or wand. To read a barcode, the tip of the pen moves across the lines in a steady motion. The photodiode measures the intensity of the light reflected back from the light source and generates a waveform that is used to measure the widths of the bars and spaces in the bar code. Dark bars in the bar code absorb light and white spaces reflect light so that the voltage waveform generated by the photo diode is a representation of the bar and space pattern in the bar code. A decoder recognizes the barcode symbology, analyzes the content of the barcode scanned, and communicates corresponding data in a usable format to another device such as a computer. While pen readers are popular because they are inexpensive and reliable, in general they are not effective for scanning barcodes any appreciable distance from the tip because the light source is typically only focused enough to distinguish between bars and stripes at the tip.

Laser scanners work the same way as pen type readers except that they typically employ either a reciprocating mirror or a rotating prism to scan a laser beam back and forth across a bar code. The laser is usually a relatively inexpensive solid state laser that produces a red light, which is easy to detect. As with a pen type reader, a photodiode is used to measure the intensity of the light reflected back from the bar code. In both pen readers and laser scanners, the time rate of change, or rise and fall time, of the signal generated by the photo detector upon sensing reflected light is a principal means for distinguishing a bar signal from other sources of ambient light. Advantageously, today laser scanners are commonplace, relatively inexpensive and highly reliable, even when a barcode is askew and/or placed quite a distance away.

A shortcoming of conventional barcode systems is that the barcodes are static and not efficient for representing codes that may change over time. Typically, they are defined and imprinted directly on items or on packaging or labels attached to items that will be tracked. Applying the barcode is inexpensive and easy to do. Once applied to an item, a barcode does not change, unless it is physically removed and replaced by or covered with an alternative barcode. Thus, a conventional printed barcode may be used to identify an item, which may then be associated with information (e.g., price, quantity, relevant dates, origins, etc . . . ) in a database that pertains to the item. As barcode readers are commonplace and inexpensive, the barcoding system provides a convenient method for item identification. However, a conventional printed or embossed barcode is not useful for directly conveying variable information.

Another shortcoming of conventional printed barcodes is that they are readily visible, decipherable and reproducible. Thus, conventional printed barcodes are not well suited for applications that require confidentiality and security of the communicated code.

Yet another shortcoming of conventional barcodes is that their integrity is easily compromised. An accurate scan requires a clear presentation of the barcode stripes and spaces. Unfortunately, however, printed barcodes are easily mutilated and obscured by abrasion and soiling.

Still another shortcoming of conventional printed barcodes is that they are vulnerable to fraud. Conventional barcode labels are easily concealed and replaced. Unscrupulous consumers have been known to replace a correct UPC label with one for a less expensive product.

Many items and circumstances could benefit from the ability to securely and wirelessly communicate variable or static information in a manner readable by a conventional laser barcode scanner. By way of example and not limitation, such technology may be applied to security badges, fault code communication systems, and item identifiers, just to name a few. However, to compete effectively with alternative forms of wired and wireless information communication (e.g., RFID, IrDA, OBD), the device must be compact, reliable, adaptable and inexpensive. Costly, complex, bulky, unreliable and/or fragile solutions would not gain industry acceptance.

What is needed is a compact, reliable, adaptable, fraud-proof and cost effective alternative to conventional printed barcodes. Preferably, the alternative system is capable of detecting the presence of a conventional laser barcode scanner and communicating information in a form readable by the detected conventional laser barcode scanner. The invention is directed to overcoming one or more of the problems and solving one or more of the needs as set forth above.

SUMMARY OF THE INVENTION

To solve one or more of the problems set forth above, in an exemplary implementation of the invention, compact, reliable, adaptable and inexpensive systems and methods for detecting the presence of a conventional optical barcode scanner and communicating light pulses in a form readable by the detected conventional barcode scanners are provided. One exemplary embodiment of a synthetic barcode module according to principles of the invention includes a light emitter assembly configured to emit light pulses. The light pulses emulate light reflected from a scanned barcode. A controller operably coupled to the light emitter assembly is configured to control emission of light pulses from the light emitter assembly. A light pipe, or a plurality of light pipes, having a collecting surface for receiving light from an external source, a guide for transmitting the received light and an outlet for emitting the transmitted light, guides light from an external source such as a barcode scanner to one or more sensor assemblies. The sensor assembly, which is operably coupled to the outlet of the light pipe and to the controller, generates a signal corresponding to sensed light from a barcode reader. The sensor assembly is adapted to detect the presence of a barcode scanner by sensing the presence of a scanning light beam such as a laser and generating a signal indicative thereof. The controller is configured to cause emission of light pulses from the light emitter assembly when the sensor assembly has generated the signal. The controller is also adapted to control timing and duration of light pulses by the light source assembly. Optionally, the sensor assembly and controller may be adapted to detect the scan rate of a barcode scanner. The sensor assembly includes a sensor configured to produce a determined signal when light from a barcode scanner is detected. The sensor assembly also includes a signal conditioner operably coupled to the sensor and controller. The signal conditioner improves the signal to noise ratio and supplies a logic level signal to the controller when a laser is detected. The light emitter assembly comprises an LED and an LED driver configured to regulate electrical power supplied to the LED.

Another exemplary embodiment of a synthetic barcode module according to principles of the invention includes an emitter/sensor assembly configured to emit light pulses that emulate light reflected from a scanned barcode. The pulses are also configured to generate a signal corresponding to sensed light from a barcode reader. The emitter/sensor assembly includes an LED configured to sense the light from the barcode reader and to generate the signal corresponding to the sensed light. The LED is also configured to emit the light pulses. A controller is operably coupled to the emitter/sensor assembly and configured to control emission of light pulses from the emitter/sensor assembly when the emitter/sensor assembly senses light from the barcode reader. The controller is adapted to control timing and duration of light pulses by the emitter/sensor assembly. The emitter/sensor assembly is adapted to detect the presence of a barcode scanner by sensing the presence of a scanning laser and generating a signal indicative thereof. Optionally, the emitter/sensor assembly and controller are adapted to detect the scan rate of a barcode scanner. The emitter/sensor assembly includes a signal conditioner operably coupled to the LED and controller. The signal conditioner is configured to improve a signal to noise ratio and supply a logic level signal to the controller when a laser is detected by the LED. The controller is adapted to control timing and duration of light pulses by the emitter/sensor assembly. The emitter/sensor assembly is adapted to detect the presence of a barcode scanner by sensing the presence of a scanning laser and generating a signal indicative thereof. Optionally, the emitter/sensor assembly and controller are adapted to detect the scan repetition rate of a barcode scanner. The emitter/sensor assembly includes a signal conditioner operably coupled to the LED and controller. The signal conditioner is configured to improve a signal to noise ratio and supply a logic level signal to the controller when a laser is detected. An LED driver is configured to regulate electrical power supplied to the LED.

An exemplary synthetic barcode method according to principles of the invention includes steps of receiving light from an external light source; generating a signal corresponding to the received light; discriminating a signal corresponding to a barcode reader laser from signals generated from other light sources; conditioning the generated signal and supplying a logic level signal to a microcontroller; determining an output signal stream, and supplying an amount and timing of drive current to an LED light source to emulate light reflected from a determined scanned barcode; and emitting light to emulate light reflected from a determined barcode. In an implementation where a single LED serves as both a sensor and light emitter, the step of generating a signal corresponding to the received light may be performed by an LED and the step of emitting light to emulate light reflected from a determined barcode may be performed by the same LED. In an implementation using light pipes, the step of receiving light from an external light source includes receiving light from an external light source via a light pipe and transmitting the received light to a sensor.

BRIEF DESCRIPTION OF THE DRAWINGS

The foregoing and other aspects, objects, features and advantages of the invention will become better understood with reference to the following description, appended claims, and accompanying drawings, where:

Figure 1A:
FIGS. 1A and 1B provide diagrams that conceptually illustrate principles of an exemplary synthetic barcode process according to principles of the invention.

Those skilled in the art will appreciate that the figures illustrate one or more exemplary embodiments and are not intended to be drawn to any particular scale; nor are the figures intended to illustrate every embodiment of the invention. Thus, the invention is not limited to the exemplary embodiments depicted in the figures or the particular circuitry, components, applications, or ornamental aspects shown in the figures.

DETAILED DESCRIPTION

Referring to the Figures, in which like parts are indicated with the same reference numerals, various views of an exemplary compact, reliable, adaptable and inexpensive system and method for communicating variable information in a form readable by a conventional laser barcode scanner are conceptually shown. For convenience of reference, an electronic assembly that detects the presence of a laser barcode scanner using a sensor and, using that same sensor or an LED separate from the sensor, emits light pulses that emulate light reflected from a determined barcode in accordance with principles of the invention is referred to herein as a synthetic barcode module.

Advantageously, a synthetic barcode module according to principles of the invention may supply an optical signal to a conventional barcode scanner, such as laser scanners in widespread use in retail and industrial establishments. The optical signal emulates light reflected from a determined barcode, such that the decoded output from the scanner is equivalent to the decoded output that would be produced by scanning the emulated printed barcode. Consequently, standard inventory universal product code (UPC) scanning technology may be employed without an actual barcode being displayed.

In an exemplary embodiment, the synthetic barcode module is configured to emit light pulses that emulate light reflected to a barcode scanner from a scanned printed barcode, which may be any type of barcode, such as, for example, UPC, SKU, EAN, Interleaved 2 of 5, Code 93, Code 128, Code 39, or any other standardized or specially designed type of barcode or barcode symbology comprising parallel lines. A typical barcode scanner uses a scanning beam, typically narrow band light in the visible spectrum such as red laser, but potentially any bandwidth of light in the visible or infrared spectra, to pass over a sequence of nonreflecting and reflecting bars, such as dark (e.g., black) bars and light (e.g., white) spaces comprising a conventional barcode. However, the invention is not limited to use with conventional black and white visible barcodes. Instead, any alternating photon reflecting and photon absorbing materials may be utilized to provide the desired light absorption and reflecting effect. As pigments tend to appear the colors they are because they selectively reflect and absorb certain wavelengths of visible light, certain pigments selected to reflect the color of light emitted by the light source may be utilized for the reflecting regions, while pigments selected to absorb the color of light emitted by the light source may be utilized for the reflecting regions. A pigment that reflects across the entire visible wavelength range (i.e., about 380-770 nanometers) appears as white. Black surfaces absorb these wavelengths. If some regions of this light are absorbed and others reflected, then the object is colored. For example, an object that absorbs all visible light except the region 400-450 nm appears blue, while another that reflects only 650-700 nm light has a red color. As further examples, chlorophyll pigments absorb blue and red light but transmit green accounting for the color of leaves. Carotenoid pigments absorb violet and blue but transmit yellow, orange, and red, accounting for the bright orange color of carrots and apricots, which are rich in carotene.

In one embodiment, the synthetic barcode module is configured to emit light pulses that emulate light reflected to a UV barcode scanner from a scanned barcode comprising an ultraviolet (UV) ink. UV ink may be used to mark a substrate with an identifying barcode indicia. A benefit of using UV ink is that it is typically not visible when illuminated with light in the visible spectrum (380-770 nm), but is visible when illuminated with light in the UV spectrum (200-380 nm). A UV barcode reader may be used to sense light reflected from the UV ink. As the UV ink is typically not visible when illuminated with light in the visible spectrum (380-770 nm), the presence and location of the barcode may only be known to initiated personnel and properly configured equipment. In this embodiment, the synthetic barcode module emits UV light pulses that are not visible and emulate light reflected to a UV barcode scanner from a scanned barcode comprising an ultraviolet (UV) ink.

In one embodiment, the synthetic barcode module is configured to emit light pulses that emulate light reflected to a IR barcode scanner from a scanned barcode comprising an ultraviolet (IR) ink. IR ink may be used to mark a substrate with an identifying barcode indicia. A benefit of using IR ink is that it is typically not visible when illuminated with light in the visible spectrum (380-770 nm), but is visible when illuminated with light in the IR spectrum (800-1600 nm). An IR barcode reader may be used to sense light reflected from the IR ink. As the IR ink is typically not visible when illuminated with light in the visible spectrum (380-770 nm), the presence and location of the barcode may only be known to initiated personnel and properly configured equipment. In this embodiment, the synthetic barcode module emits IR light pulses that are not visible and emulate light reflected to a IR barcode scanner from a scanned barcode comprising an ultraviolet (IR) ink.

Figure 1B:
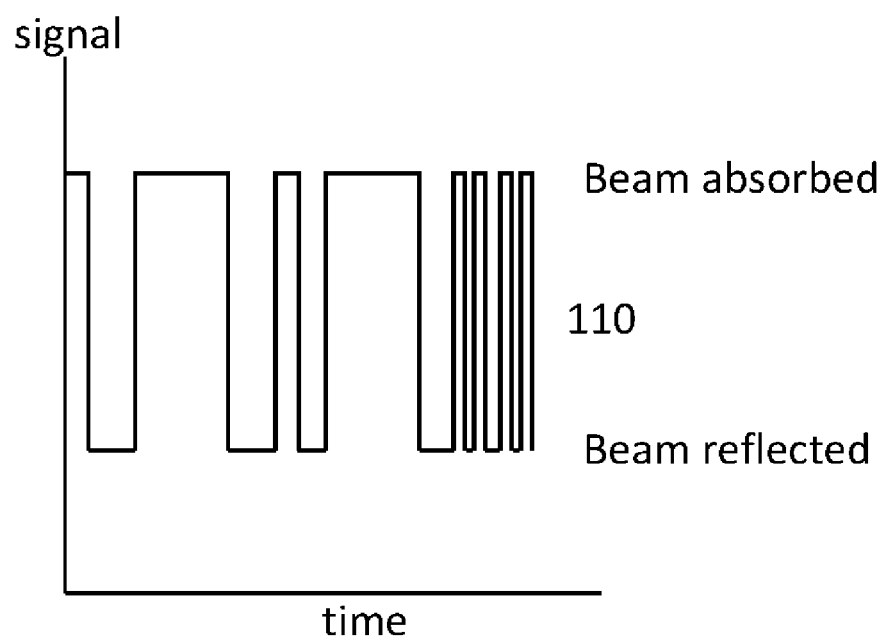

Scanning may progress sequentially left to right and/or right to left. As the beam of light scans across a barcode, such as the barcode 100 shown in FIG. 1A, the beam is at least partially reflected back to the scanner by the spaces and at least partially absorbed by the bars. A receiver, such as a photocell detector, in the barcode scanner receives the reflected beam and converts it into an electrical signal. As the beam scans across the barcode, the scanner typically creates one electrical signal for the spaces where the beam is reflected, and a different electrical signal for the bars where the beam is absorbed. This process is conceptually illustrated by the signal stream 110 in FIG. 1B. The scanning speed and the width of each space and bar determine the duration of each electrical signal. The signals (including its duration) are decoded by the scanner or by an external processor into characters that the barcode represents.

Figure 2:
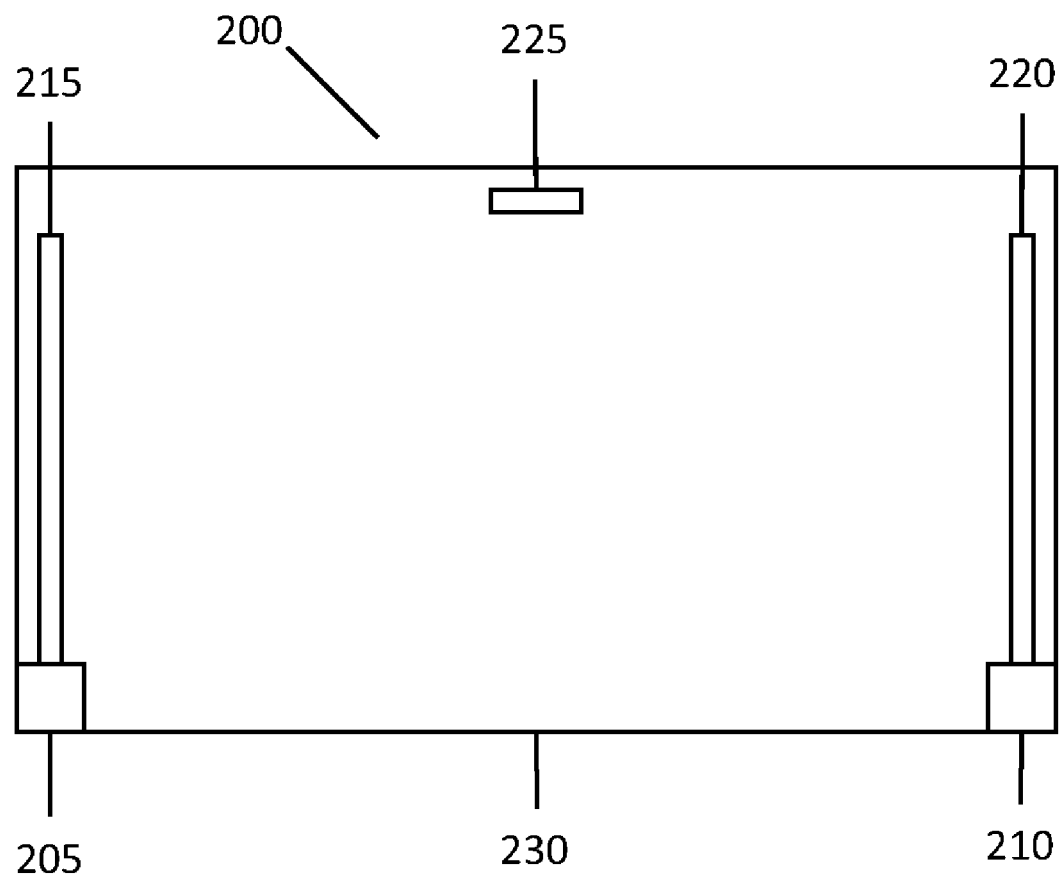
FIG. 2 provides a high level block diagram of exemplary components of a synthetic barcode module assembly according to principles of the invention.

As conceptually illustrated in FIG. 2, a first embodiment of an exemplary synthetic barcode scanning module 200 comprises an assembly that is intended to be the target of the standard inventory barcode scanners used by retailers for automatic UPC/SKU entry. The assembly generally includes a light source 225, one or more light pipes 215 and 220, and one or more optical sensors 205 and 210. The light source 225, such as an LED light source, controllably produces light pulses comparable to reflected light received by a barcode scanner upon scanning a barcode. The light pulses may be generated in any wavelength compatible with a barcode scanner. Preferably, the wavelength and intensity is functionally equivalent or comparable to the wavelength and intensity of light (i.e., typically red laser light) reflected from a printed barcode. While any suitable light source, such as LED, laser, infrared transmitter, backlit LCD, may be utilized to controllably generate the desired light pulses, one or more LEDs is preferred. By way of example and not limitation, one or more LEDs 225 may be used to produce the light pulses that will be interpreted by the barcode scanner as the reflected light from a printed barcode that is being emulated. The LED 225 produces pulses of light with on and off timing to simulate the bright and dark reflective surfaces of a printed barcode being scanned by the laser of a UPC/SKU scanner. The LED 225 may be comprised of a row of LEDs horizontally arranged across a scan area, to provide direct light signals to a barcode scanner throughout a range of scanning.

As used herein, the term light pipe means any optical device or combination of devices having a collecting surface through which light may be received, a guide through which received light is directed from the collecting surface to an outlet, and the outlet through which all or most of the received light is emitted. In an exemplary embodiment, the light pipe generally comprises an elongated transparent or translucent member having a large collecting surface, a guide portion with reflection surfaces and an outlet. When a light ray is directed at the collecting surface portion of the light pipe, the light is received in the guide and reflected along a trajectory toward an outlet adjacent to or abutting an optical sensor. The light pipe facilitates total internal reflection of the light and hence passes most or all of the light to the outlet for detection by the sensor. The front glass of an LCD may also serve as a light pipe as described above.

Each light pipe 215 and 220 receives light from a scanning beam that crosses anywhere along the length of the light pipe 215 and 220. The light pipe transmits the received light to an optical sensor 205 and 210, which is configured to detect the presence and transit time of the scanning laser beam. Advantageously, the light pipe 215 and 220 captures light incident over a broad are of coverage. While one light pipe 215 and 220 is shown for each of two optical sensors 205 and 210 in FIG. 2, those skilled in the art will appreciate that the invention is not so limited. One or more light pipes may direct received light to one or more optical sensors. The invention is not limited to one light pipe per sensor or to one sensor per light pipe.

Each optical sensor 205 and 210 is configured to receive light from the corresponding light pipe 215 and 220. A sensor 205 and 210 is used to detect when the scanning area is being scanned by a barcode reader. When laser light is sensed by the sensor, a signal is produced to signify that a barcode scanner is present. The sensors 205 and 210 may also be employed to measure the transit time of the beam across the specified scanning area. Illustratively, a sensor 205 and 210 may be configured to produce a low (logical state) signal when no laser is detected and a high signal when a laser is detected. The time between successive high signals corresponds to one scanner sweep. A controller, such as a microcontroller (or other logical computing device) can determine a scan rate (e.g., in scans per second) from the duration of one scan sweep. Assuming, for example, a scan rate is 60 scans per second, then, in 1/60 of a second, the light pulses corresponding to a barcode are received by the scanner. The duration of each light pulse may equal the scan time multiplied by a fraction, the numerator of which is the width of the reflecting white space corresponding to the pulse and the denominator of which is the width of the scanned area (e.g., the width of the barcode). Thus, the transit time information may be used to control the rate and duration of pulses sent from the light source LED 225 so that the emitted light signal is equivalent to the light that would be reflected from a printed version of the barcode. Only one optical sensor 205 or 210 might be needed in some embodiments, merely to detect the presence of a scanning laser.

Optionally, a barcode scanning rate may be hard-coded or provided as an input value to the system, in lieu of the determination described above. For example, an operator may select a scanner make and model from a list available at a control computer. Based upon the selection, a software driver may be loaded that provides a scanning rate for communication to the module. The driver may also supply other scanner-specific characteristics, such as reflected light parameters, to enhance reliability of the scanning process. Illustratively, such parameters may be utilized if the module includes a variable light source or a plurality of light sources, each of which may provide different wavelengths and/or intensities of light to increase the compatibility of the module with different barcode scanners.

Figure 3:
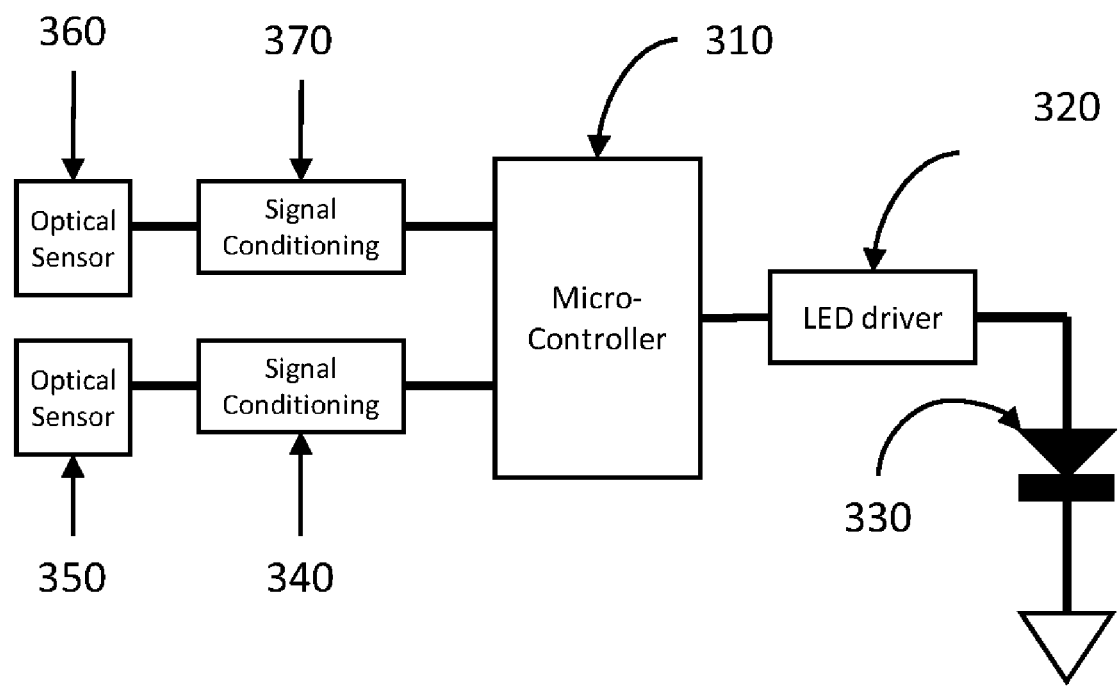
FIG. 3 provides a high level block diagram of components of an exemplary synthetic barcode module circuit with a plurality of optical sensors (as shown in FIG. 2) according to principles of the invention.

Referring now to FIG. 3 a high level block diagram of signal processing components of an exemplary synthetic barcode module according to principles of the invention is shown. Each optical sensor 350 and 360 receives light from an external source such as a scanning barcode reader. When scanning laser light is sensed by a sensor 350 and 360, a signal is produced to signify that a barcode scanner is present. The sensors 350 and 360 may also be employed to measure the transit time of the beam across the specified scanning area. Illustratively, a sensor 350 and 360 may be configured to produce a low (logical state) signal when no laser is detected and a high signal when a laser is detected. A signal conditioner 340 and 370 improves the signal to noise ratio from each optical sensor 350 and 360 and supplies logic level signals to a microcontroller 310 when a scanning laser is observed. The signal conditioner 340 and 370 and/or microcontroller 310 may also discriminate a signal corresponding to a barcode reader laser from signals generated from other light sources.

The microcontroller 310 receives conditioned signals from the optical sensors 350 and 360 via the signal conditioners 340 and 370, reacts to the presence of a scanning light beam and possibly measures transit time. The microcontroller 310 may be comprised of any suitable controlling device, such as a logic circuit, a microprocessor, a combination of these elements, and the like. It is understood that the transit time measurement may not be needed in some embodiments of this invention. The microcontroller 310 may have an internal clock oscillator as the time base for all operations. Alternatively, a crystal and associated circuitry may be utilized for a timing base. It may also have internal memory, which may store programming for the module and a table that determines the time and duration the LED 345 must be illuminated in order to generate light pulses comprising the synthetic barcode signal. The timing data for barcode synthesis may reside in the microcontroller 310 from manufacture or may be downloaded at some later point through any type of communications medium, e.g. RS232, RF data link, optical data link, etc.

An LED driver 320 supplies a correct amount of drive, i.e., regulates the power, to an LED light source 330. In some embodiments, the LED driver 320 may be comprised of one or more pins on the microcontroller 310 with a current limiting resistor. A switched current source or current sink may be used to drive the LED 330. A preferred LED driver 320 may respond to the ever-changing needs of the LED, or circuit of LEDs, by supplying a constant amount of current to the LED as its electrical properties change, such as with temperature.

Figure 4:
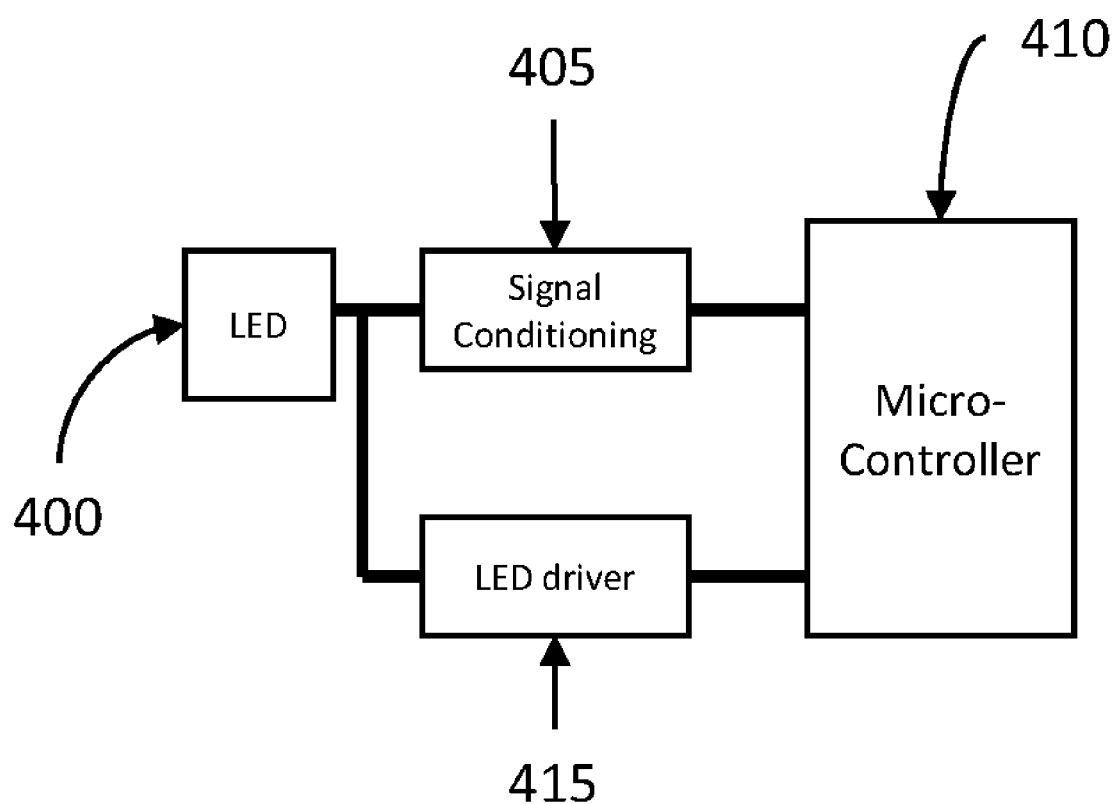
FIG. 4 provides a high level block diagram of components of an exemplary synthetic barcode module circuit with a combination sensor/emitter according to principles of the invention.

In an alternate embodiment, the separate sensors are eliminated, and an LED serves as both an optical sensor and light source, as conceptually illustrated in FIG. 4. Advantageously, the LED 400 may be very small. The LED 400 will generate an electrical signal upon exposure to the direct laser scanning beam. While an LED is generally not an efficient photocell, in the presence of a laser scanner an LED will produce a sensible signal, e.g., enough microamps at enough volts to operate an amplifier or logic gate. Although one LED 400 is shown in FIG. 4, those skilled in the art will appreciate that a plurality of LED 400 may be utilized, at least one of which serves as both a light emitter and a sensor, within the scope of the invention.

A signal conditioner 405 improves the signal to noise ratio from the LED 400 and supplies logic level signals to a microcontroller 410 when a scanning laser is observed by the LED 400. The signal conditioner 405 circuitry is configured to detect the weak signal (e.g., a few microamps at a few volts) generated by the LED 400, discriminate the laser pulse form other light sources, perhaps due to voltage rise time, and then adjust the signal voltage to the input level required by the microcontroller 410. This signal conditioner 405 has a high enough input impedance that it is not affected by the drive voltage delivered to the LED 400 by the LED driver 415. The signal conditioner 405 and/or microcontroller 410 may also discriminate a signal corresponding to a barcode reader laser from signals generated from other light sources.

The microcontroller 410 is a programmable electronic device that will respond to the signal from the signal conditioner 405 to determine that the device is being scanned by a barcode scanner. The microcontroller 410 will have been preprogrammed to transmit light pulses in a fashion to simulate the reflections from printed barcodes using the EAN-13, UPC-A, or other standard barcode systems.

The microcontroller 410 receives conditioned signals via the signal conditioner 410, reacts to the presence of a scanning light beam. The microcontroller 410 may be comprised of any suitable controlling device, such as a logic circuit, a microprocessor, a combination of these elements, and the like. The microcontroller 410 may have an internal clock oscillator as the time base for all operations. Alternatively, a crystal and associated circuitry may be utilized for a timing base. It may also have internal memory, which may store programming for the module and a table that determines the time and duration the LED 400 must be illuminated in order to generate light pulses comprising the synthetic barcode signal. Timing data for barcode synthesis may reside in the microcontroller 410 from manufacture or may be downloaded at some later point through any type of communications medium, e.g. RS232, RF data link, optical data link, etc.

The microcontroller 410 will send a control signal to the LED driver 415 to make the LED 400 turn on and off with sufficient brightness, and at the correct timing, for the emitted light to be interpreted by a standard laser barcode scanner as the signal from a printed barcode. The LED driver 415 could easily be included or integrated into the microcontroller 410.

An LED driver 415 supplies a correct amount of drive to the LED light source 400. In some embodiments, the LED driver 415 may be comprised of one or more pins on the microcontroller 410 with a current limiting resistor. A switched current source or current sink may be used to drive the LED 400.

Figure 5:
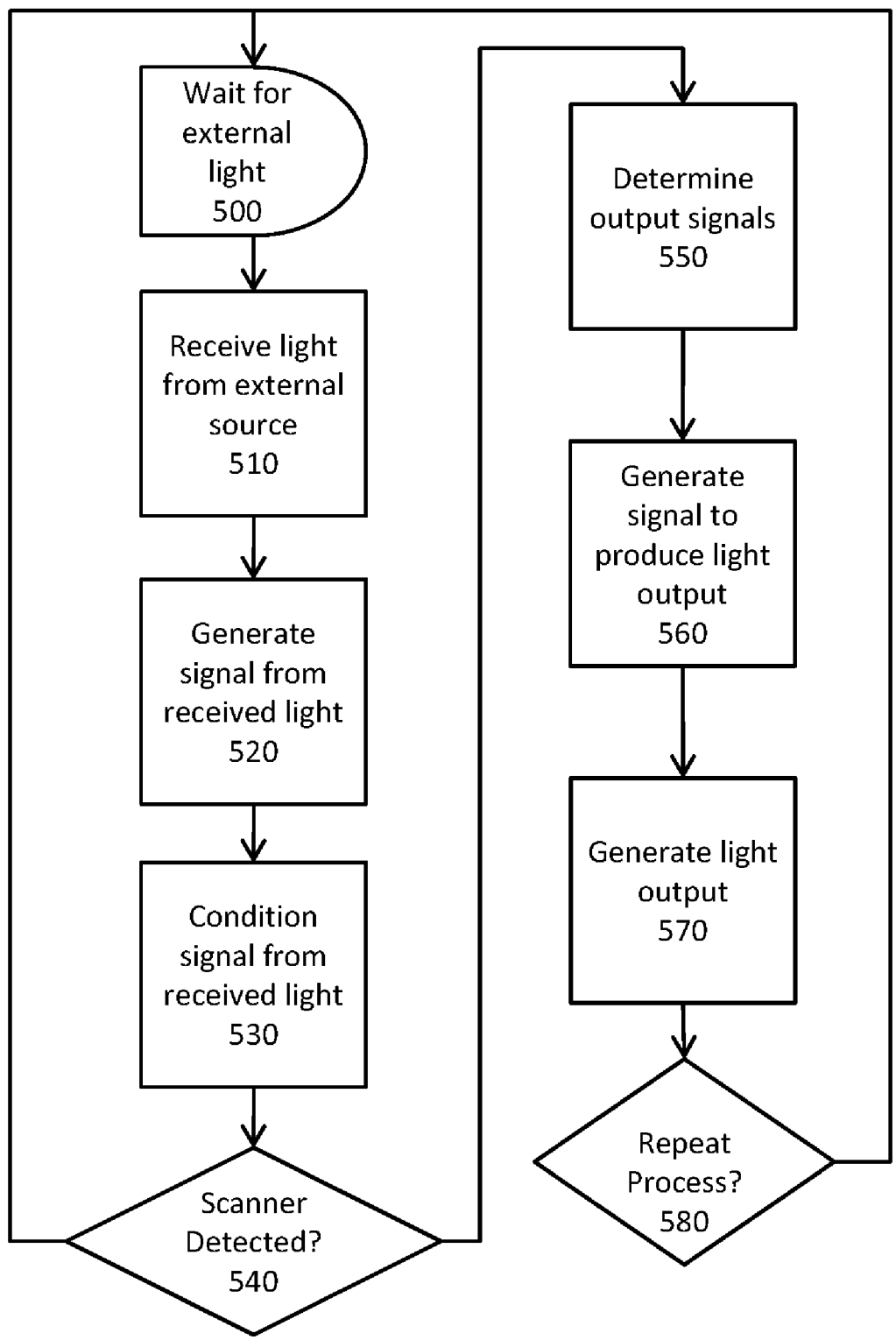
FIG. 5 provides a high level flowchart of steps of an exemplary synthetic barcode method according to principles of the invention.

Advantageously, the alternative embodiment as illustrated in FIGS. 4 and 5 can be extremely compact, built only slightly larger than the LED itself with the use of die components and a small battery. As another advantage, this embodiment would consume very little battery energy until it was actually interrogated by a laser scan. With such a low duty cycle, a good battery could be expected to last a considerable time (e.g., possibly years).

In operation when a laser barcode scanner hits the LED 400 it causes the microcontroller 410 to send out a predefined series of light flashes corresponding to light reflected to a scanner upon scanning a barcode. When that series of light flashes has been sent, the system 400 waits for another hit from a scanning laser beam to repeat the process. The timing of the transmitted light pulses may be preprogrammed in the microcontroller 410. The microcontroller 410 may be programmed to send out different sets of codes on successive laser hits as a means of sending a larger volume of information. The microcontroller 410 may also be programmed to send out different sets of codes on successive laser hits to identify multiple Universal Product Codes (UPCs), representing multiple actual products, with which the inventions is intended to be associated, thereby communicating information on multiple products from one scan. The codes may be configured to communicate any ASCII character or special code symbol. The microcontroller 410 may be designed to accept new instructions and programming through the LED 400 and signal conditioning means 440. There could be a simple optical protocol by which the microcontroller 410 will replace existing instructions with new data received through this optical input path. This could make the invention easily reconfigured for a different product's UPC if it were transferred. The microcontroller 410 may be configured to accept new instructions and programming through electrical contacts or by an inductive pickup coil. A simple protocol may allow the microcontroller 410 to replace existing instructions with new data received through this path. This could make the invention easily reconfigured to emulate a different barcode. Thus, for example, the system may be configured and reconfigured, programmed and re-programmed, to emulate many different product UPCs. Any and all of the signal conditioning, microcontroller and LED driver functionality described above could be included in the microcontroller of a system of broader functionality and purpose.

In another embodiment, the microcontroller 410 may be programmed to send out a reference code as a means of revealing a large volume of information. By way of example and not limitation, the microcontroller 410 may cause the LED 400 to emit a multi-digit code (e.g., a normal 13 digit code) which may reference huge amounts of data available through a secure network. Illustratively, upon scanning the device, vast amounts of data including photographs and other anthropometric data could be retrieved from one or more data sources using the multi-digit code. In a security implementation, for example, a wearer's photograph may instantly appear on a security person's terminal. In sum, the amount of data referenced is not limited to what can be stored and transmitted from a synthetic barcode device according to principles of the invention.

Those skilled in the art will appreciate that a synthetic barcode system and method according to principles of the invention may be utilized in many different industries and applications. By way of example and not limitation a synthetic barcode system and method according to principles of the invention, because of its compact configuration, may be used as a security data bank on a personal identification badge. Anthropometric data and other information could be encrypted in the system and then transmitted to an inexpensive barcode reader. Similarly, such a device may be used for access control, such as around airports. Again the inherent advantage is that the readout technology is very common and inexpensive.

As another example, a synthetic barcode system and method according to principles of the invention, because of its compact configuration, may be used as a security access for software packages, or online banking and trading. In this application the microcontroller could be programmed to produce a pseudo-random set of numbers each time it is scanned, such as a car door opening transmitter. The matching pseudo-random algorithm would reside in the protected system requiring restricted access. This may comprise a code hopping algorithm, or other method of changing access codes.

As yet another example, credit cards could be manufactured with an embedded synthetic barcode system according to principles of the invention. Then credit card data could be read at the checkout counter in the store, by the same device that is used to scan prices for all of the items being purchased. This has the advantage of not being alterable by a simple magnetic strip reader.

As another example, a synthetic barcode system and method according to principles of the invention, because of its compact configuration, may be used as unobtrusive ID labels for personal items. For example, ownership, origin, location, composition, date, and price information may be encoded in and conveyed by the system if that question should arise.

A longer range version may be used to identify persons, or objects, at a distance. A computer system could automatically keep track of who is present at a particular locale, or who or what has passed through a laser scanned check point. The effective distance may be increased by increasing sensitivity in detecting a scanner and also by increasing LED output.

Other applications may include data ports. Indeed, any application that requires transmission of data from one device to an external reader may benefit from a synthetic barcode system and method according to principles of the invention. For instance, a synthetic barcode system and method according to principles of the invention may be used as a data port for free-space optical communication, namely, data transmission from the port to any laser barcode reader. Adequate detection sensitivity and emitting irradiance be maintained so that an emitted light signal is visible to a barcode reader a distance, e.g., several feet or meters, away. The advantage of this means of communication is that it can be compact in size and extremely energy efficient, obviates a wired link, and merely requires an inexpensive, reliable, barcode reader, which may be utilized for any other barcode reading tasks as well. Costly, proprietary, wired interfaces may thus be avoided. Also avoided are complicated configuration and pairing steps and incompatibilities that so frequently plague other methods of wireless communication.

Referring now to FIG. 5, a high level flowchart of steps of an exemplary synthetic barcode method according to principles of the invention is conceptually shown. The method entails waiting to receive light from an external source, as in step 500. To conserve power, a system implementing the method may sit idle until light is received. Light is received from an external source, which may include laser light emanating from a barcode reader or light emitted from other nearby light sources, as in step 510. The light may be collected by a light transmission means such as a light pipe, lens or mirror, and then transmitted to an optical sensor. Next, the sensor generates a signal corresponding to the received light, as in step 520. A signal conditioner receives and conditions the signal from the sensor by improving the signal to noise ratio and supplying logic level signals to a microcontroller, as in step 530. The signal conditioner may be configured to discriminate a signal corresponding to a laser pulse from a barcode reader from signals generated from other light sources based upon signal characteristics such as voltage rise time, as in step 540. A programmed microcontroller receives the conditioned signals and determines an output signal stream, as in step 550. An LED driver receives the signals output from the microcontroller and supplies a correct amount and timing of drive current to an LED light source to emulate light reflected from a determined scanned barcode, as in step 560. The LED light source receives the drive current from the LED driver and emits light to emulate light reflected from a determined scanned barcode, as in step 570. The process may be repeated so long as an adequate power supply is available, as in step 580. Advantageously, in a particular exemplary embodiment of the invention, the device that emits the light in step 570 may be an LED and the same device (i.e., same LED) used to generate a signal from the received light in step 520. As another advantage, in another particular exemplary embodiment, one or more light pipes facilitate the capture (i.e., receipt) and transmission of light from an external source, as in step 510.

While an exemplary embodiment of the invention has been described, it should be apparent that modifications and variations thereto are possible, all of which fall within the true spirit and scope of the invention. With respect to the above description then, it is to be realized that the optimum relationships for the components and steps of the invention, including variations in order, form, content, function and manner of operation, are deemed readily apparent and obvious to one skilled in the art, and all equivalent relationships to those illustrated in the drawings and described in the specification are intended to be encompassed by the present invention. The above description and drawings are illustrative of modifications that can be made without departing from the present invention, the scope of which is to be limited only by the following claims. Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents are intended to fall within the scope of the invention as claimed.

What is claimed is:

1. A synthetic barcode module, said module including
   a light emitter assembly configured to emit light pulses, said light pulses emulating light reflected from a scanned barcode;
   a controller operably coupled to the light emitter assembly and configured to control emission of light pulses from the light emitter assembly;
   a light pipe having a collecting surface for receiving light from an external source, a guide for transmitting the received light and an outlet for emitting the transmitted light; and
   a sensor assembly operably coupled to the outlet of the light pipe and to the controller, said sensor assembly being configured to generate a signal corresponding to sensed light from a barcode reader, and said controller being configured to cause emission of light pulses from the light emitter assembly when the sensor assembly has generated said signal.

2. A synthetic barcode module according to claim 1, wherein the controller is adapted to control timing and duration of light pulses by the light source assembly.

3. A synthetic barcode module according to claim 1, wherein the sensor assembly is adapted to detect the presence of a barcode reader by sensing the presence of a scanning laser and generating a signal indicative thereof.

4. A synthetic barcode module according to claim 1, wherein the sensor assembly and controller are adapted to detect the scan rate of a barcode reader.

5. A synthetic barcode module according to claim 1, wherein the sensor assembly comprises a sensor configured to produce a determined signal when a laser is detected and a signal conditioner operably coupled to the sensor and controller, said signal conditioner being configured to improve a signal to noise ratio and supply a logic level signal to the controller when a laser is detected.

6. A synthetic barcode module according to claim 1, wherein the light emitter assembly comprises an LED and an LED driver configured to regulate electrical current supplied to the LED.

7. A synthetic barcode module according to claim 1, wherein
   the controller is adapted to control timing and duration of light pulses by the light source assembly; and
   the sensor assembly is adapted to detect the presence of a barcode reader by sensing the presence of an optical scanning device and generating a signal indicative thereof.

8. A synthetic barcode module according to claim 7, wherein the sensor assembly and controller are adapted to detect the scan rate of a barcode reader.

9. A synthetic barcode module according to claim 7, wherein
   the sensor assembly comprises a sensor configured to produce a determined signal when a n optical scanning device is detected and a signal conditioner operably coupled to the sensor and controller, said signal conditioner being configured to improve a signal to noise ratio from the sensor supply a logic level signal to the controller when a laser is detected; and
   the light emitter assembly comprises an LED and an LED driver configured to regulate electrical power supplied to the LED.

* * * * *